(12) United States Patent
Bunch et al.

(10) Patent No.: US 7,474,507 B2
(45) Date of Patent: Jan. 6, 2009

(54) STORAGE DEVICE HAVING SLIDER WITH SACRIFICIAL EXTENSION ALIGNED WITH CHANNEL ON OPPOSITE SURFACE

(75) Inventors: Richard D. Bunch, San Jose, CA (US); Jeffrey S. Lille, Sunnyvale, CA (US); Huey-Ming Tzeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/901,748

(22) Filed: Sep. 19, 2007

(65) Prior Publication Data
US 2008/0007872 A1 Jan. 10, 2008

Related U.S. Application Data

(60) Continuation of application No. 10/938,236, filed on Sep. 10, 2004, now abandoned, which is a division of application No. 10/893,024, filed on Jul. 15, 2004, now Pat. No. 6,997,784, which is a division of application No. 10/224,218, filed on Aug. 19, 2002, now Pat. No. 6,776,690.

(51) Int. Cl.
*G11B 5/60* (2006.01)
*G11B 17/32* (2006.01)
*G11B 21/21* (2006.01)
(52) U.S. Cl. .................................. 360/234.3; 360/237
(58) Field of Classification Search ............... 360/234.3, 360/234.5, 234.6, 236.2, 236.3, 237
See application file for complete search history.

(56) References Cited

U.S. PATENT DOCUMENTS 3,823,416 A 7/1974 Warner (Continued)

FOREIGN PATENT DOCUMENTS

EP 0 880 128 A1 11/1998

(Continued)

OTHER PUBLICATIONS

IBM, "Method for Lapping Silicon Slider with Alumina Overcoat to Eliminate Silicon Dioxide Protrusion", IBM Technical Disclosure Bulletin, vol. 40, pubno. 9, Sep. 1997, p. 93.

*Primary Examiner*—Craig A Renner
(74) *Attorney, Agent, or Firm*—G. Marlin Knight

(57) ABSTRACT

A disk drive including a slider with one or more sacrificial structures (extensions) that facilitate lapping to create the air-bearing surface (ABS) is described. The slider includes a magnetic transducer and has a remaining portion of a sacrificial extension protruding on an air-bearing surface, the remaining portion of the sacrificial extension is narrower than the air-bearing surface and aligned with the magnetic transducer. The sacrificial extension makes the surface of the slider which will be lapped non-planar. The sacrificial extension extends below the predetermined ABS plane. When the sliders are individually separated by DRIE, the shape of a mask including the sacrificial extension is projected down into and along the slider body. The mask and resulting slider includes a channel in the slider body that is aligned with the sacrificial extension and disposed on a surface of slider body that is parallel to and opposite from the air-bearing surface.

7 Claims, 6 Drawing Sheets

U.S. PATENT DOCUMENTS

| | | | |
|---|---|---|---|
| 3,990,106 A * | 11/1976 | Kameyama et al. | 360/234.6 |
| 4,219,853 A * | 8/1980 | Albert et al. | 360/234.5 |
| 4,996,614 A | 2/1991 | Okutsu | |
| 5,023,738 A * | 6/1991 | Prenosil | 360/235.2 |
| 5,243,482 A * | 9/1993 | Yamaguchi et al. | 360/245.1 |
| 5,321,882 A | 6/1994 | Zarouri et al. | |
| 5,329,689 A | 7/1994 | Azuma et al. | |
| 5,513,056 A | 4/1996 | Kawasaki et al. | |
| 5,588,199 A | 12/1996 | Krounbi et al. | |
| 5,772,493 A | 6/1998 | Rottmayer et al. | |
| 5,850,320 A * | 12/1998 | Warmka et al. | 360/234.6 |
| 6,027,397 A | 2/2000 | Church et al. | |
| 6,040,959 A | 3/2000 | Kobayashi et al. | |
| 6,081,991 A | 7/2000 | Tsunoda et al. | |
| 6,093,083 A | 7/2000 | Lackey | |
| 6,101,066 A | 8/2000 | Ishihara et al. | |
| 6,112,401 A | 9/2000 | Smith, Jr. | |
| 6,163,954 A | 12/2000 | Nakagawa | |
| 6,193,584 B1 | 2/2001 | Rudy et al. | |
| 6,623,330 B2 | 9/2003 | Fukuroi | |

FOREIGN PATENT DOCUMENTS

| | | | |
|---|---|---|---|
| JP | 03-263605 A | | 11/1991 |
| JP | 05182143 A | * | 7/1993 |
| JP | 06-282829 A | | 10/1994 |

* cited by examiner

STORAGE DEVICE HAVING SLIDER WITH SACRIFICIAL EXTENSION ALIGNED WITH CHANNEL ON OPPOSITE SURFACE

RELATED APPLICATIONS

This is a continuation application of the application bearing Ser. No. 10/938,236 filed on Sep. 10, 2004 now abandoned which is a divisional of parent application bearing Ser. No. 10/893,024 filed on Jul. 15, 2004 which has issued as U.S. Pat. No. 6,997,784 and which is a divisional of parent application bearing Ser. No. 10/224,218 filed on Aug. 19, 2002 which has issued as U.S. Pat. No. 6,776,690.

BACKGROUND OF THE INVENTION

1. Field of the Invention

This invention relates in general to sliders for use in magnetic storage devices, and more particularly to slider fabrication methods and slider designs that facilitate fabrication and even more particularly to lapping requirements of slider designs and methods for lapping surfaces on a slider.

2. Description of Prior Art

A typical prior art head and disk system 10 is illustrated in FIG. 1. In operation the magnetic transducer 20 is supported by the suspension 13 as it flies above the disk 16. The magnetic transducer, usually called a "head" or "slider" is composed of elements that perform the task of writing magnetic transitions (the write head 23) and reading the magnetic transitions (the read head 12). The electrical signals to and from the read and write heads 12, 23 (collectively "magnetic transducer elements") travel along conductive paths (leads) 14 which are attached to or embedded in the suspension 13. Typically there are two electrical contact pads (not shown) each for the read and write heads 12, 23. Wires or leads 14 are connected to these pads and routed in the suspension 13 to the arm electronics (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The read head 12 reads magnetic transitions as the disk rotates under the air-bearing surface (ABS) of the magnetic transducer 20.

FIG. 2 is a midline section of one type of prior art magnetic transducer 20 shown prior to lapping. The substrate 43 of the slider is typically a hard durable material. The components of the read head 12 shown are the first shield (S1), surround the sensor 105 which is surrounded by insulation layers 107, 109 and the second shield (P1/S2). This type of magnetic transducer is called a "merged head" because the P1/S2 layer serves as a shield for the read head 12 and a pole piece for the write head 23. The yoke also includes a second pole piece (P2) which connects with P1/S2 at the back The P2 curves down over coil 37 to confront the P1 across the write gap layer to form the write gap at the air-bearing surface (ABS). The zero throat height (ZTH) is defined as the point where the P2 first touches the gap layer. The sensor 105 includes a magnetoresistive material such as permalloy, but may be a multilayered structure containing various layers of ferromagnetic and antiferromagnetic material. The shields and pole pieces are ferromagnetic materials, e.g., NiFe or CoFe. Prior to lapping the materials and structures at the ABS extend beyond the ABS. As illustrated in FIG. 2 the material to the right of the ABS plane is removed by lapping to achieve precise control of the length of the sensor 105 (which is called the "stripe height") and the distance from the ZTH to the ABS (which is called the "throat height"). The uncertainty of the saw plane causes variations in the stripe height which are on the order of microns and which would lead to unacceptable variations in magnetic performance is not corrected. Lapping is the process used in the prior art to achieve much tighter stripe height control in the nanometer range.

In the typical process of fabricating thin film magnetic transducers, a large number of transducers are formed simultaneously on a wafer. After the basic structures are formed the wafer may be sawed into quadrants, rows or individual transducers. Further processing may occur at any or all of these stages. Although sawing has been the typical method for separating the wafers into individual sliders, recently reactive ion etching (RIE) or deep reactive ion etching (DRIE) with a fluorine containing plasma has been used. The surfaces of the sliders perpendicular to the surface of the wafer that are exposed when the wafers are cut form the air bearing surface (ABS) of the slider.

After lapping, features typically called "rails" are formed on the ABS of magnetic transducer 20. The rails have traditionally been used to determine the aerodynamics of the slider and serve as the contact area should the transducer come in contact with the media either while rotating or when stationary.

U.S. Pat. No. 5,321,882 to Zarouri, et al., discloses a process for forming slider air-bearing surfaces one at a time. The sliders are supported by a mechanical backing while being processed sequentially from a column cut from the wafer. In U.S. Pat. No. 6,093,083 to Lackey, a row of sliders is processed while being rigidly bound to a carrier.

Sliders may be lapped in rows, but it may be advantageous to have the individual sliders cut out prior to lapping. Even though the sliders have been separated, it is possible to lap several at one time by attaching them to carrier. The time required to lap sliders is a significant element in the cost of manufacturing; therefore, there is a need to improve production efficiency by reducing lapping time, and achieve an ABS surface with a greater control of flatness parameters.

SUMMARY OF THE INVENTION

A process will be described for fabricating sliders with one or more sacrificial structures (extensions) that reduce the amount of time required for lapping to create the air-bearing surface (ABS). In accordance with the present invention the amount of slider material to be removed by lapping is reduced, and additional lapping or polishing steps are eliminated.

Prior to separating individual sliders from a wafer, a mask of material that is not removable by deep reactive ion etching (DRIE) is patterned on the surface of the sliders. The mask outlines a sacrificial extension around portions of the magnetic transducer elements that are nearest the predetermined plane which will become the ABS. The sacrificial extension makes the surface of the slider which will be lapped non-planar. The sacrificial extension extends below the predetermined ABS plane. When the sliders are individually separated by DRIE, the shape of the mask including the sacrificial extension is projected down into and along the slider body. The sacrificial extension covers the thin film elements of the read and write heads. The surface of the slider contains a smaller amount of material (with a high aspect ratio) to be removed by lapping relative to prior art designs which require removal of material on the entire planar surface of the slider. The sacrificial extension reduces the amount material to be removed by lapping while maintaining the ability to precisely control the magnetoresistive stripe and throat heights. In one embodiment, additional guide rails are disposed along the outer edges of the slider ABS to facilitate maintaining slider symmetry during the lapping process and prevent the slider from canting to one side. The sacrificial extension and the guide rails are partially or completely removed during the lapping process. The shape of the sacrificial extensions may be optimized for the various embodiments.

In another embodiment, the sacrificial extension is formed with a cross-sectional shape having a narrow neck which encourages breakage during the ABS lapping process, thus, further accelerating the process. In another embodiment, a channel is disposed on the side of the slider opposite the ABS to provide space for the sacrificial extension of the adjacent slider and allow the sliders to be spaced closer together on the wafer surface for more efficient use of the wafer during head fabrication.

BRIEF DESCRIPTION OF THE DRAWINGS

For a more complete understanding of the nature and advantages of the invention, as well as the preferred modes of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 1:
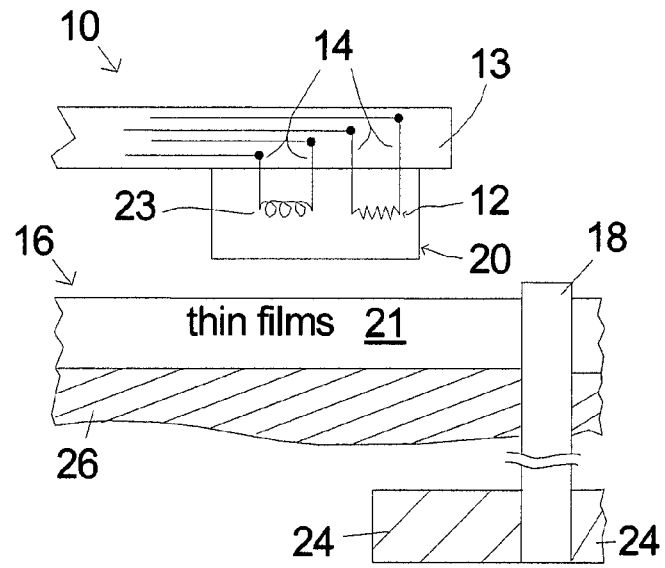
FIG. 1 is a simplified drawing illustrating a magnetic disk drive system of a type in which a slider in accordance with the present invention can be used.
Figure 2:
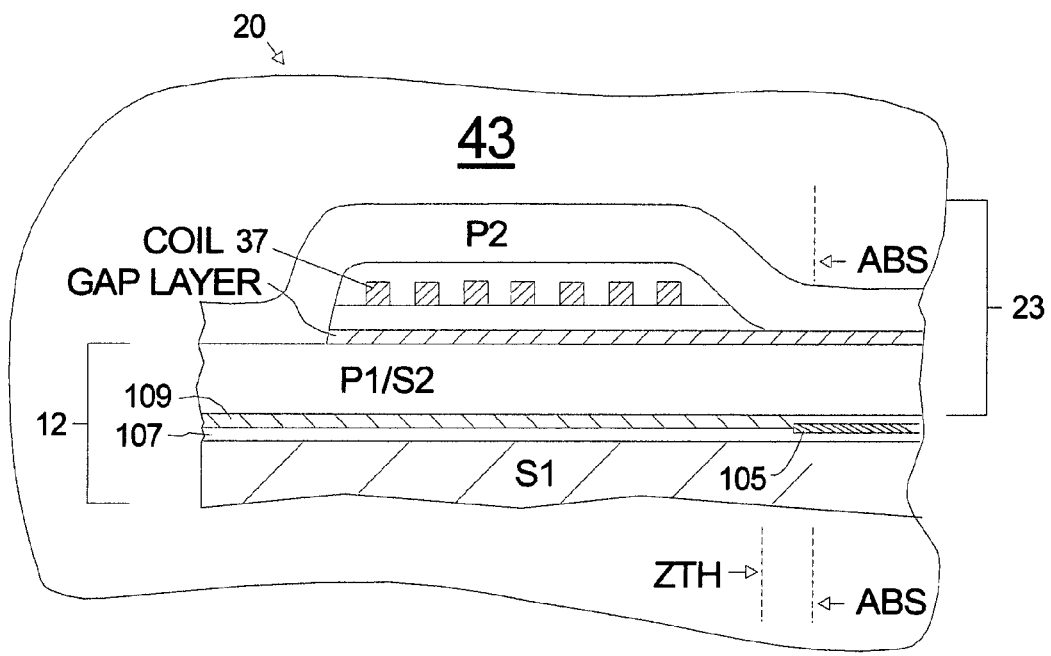
FIG. 2 is a midline sectional view of a type of prior art magnetic transducer, prior to lapping, illustrating the effect and purpose of lapping the slider.
Figure 3:
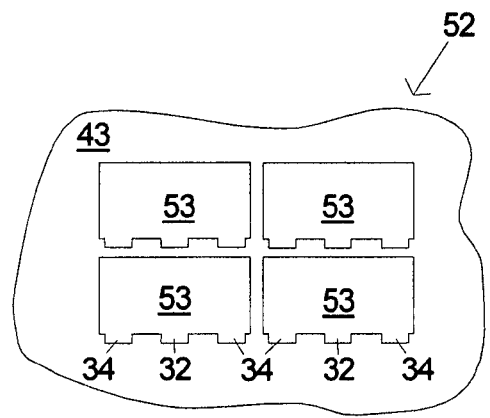
FIG. 3 is a partial view of a wafer with a plurality of masks for sliders according to a first embodiment of the invention.

FIG. 3 is a partial view of a wafer 52 with a plurality of masks 53 for sliders according to a first embodiment of the invention. The substrate 43 is a material which is amenable to DRIE, for example, silicon. The masks 53 outline the shape of the sliders and the sacrificial extension 32 and optionally the guide rails. The mask 53 is made of a material that is resistant to DRIE, for example, photoresist or alumina. When the wafer 52 is subjected to DRIE with the ions being directed substantially perpendicular to the surface of the wafer, the individual sliders with the sacrificial extension are cut out in the shape of the mask. Although non-RIE-able material in the head structure (not shown) may also be used to define the shape of the sacrificial extension, this has the disadvantage of potentially allowing some of the head material to be sputtered off and redeposited in the kerf and thereby interfering with the clean separation of the sliders. The details of the cross-sectional shape of the sacrificial extension 32 and optional guide rails 34 are determined by the shape of the mask 53. The shape and dimension of these features will vary according to various embodiments of the invention. The shape of the sacrificial extension need not include a planar surface and, therefore, can include curved and irregular shapes. The mask 53 in combination with DRIE allows the removal or more material between the sliders than is feasible using prior art sawing techniques. By lessening the amount of material to be removed by lapping, the technique of the invention allows the lapping process to proceed more quickly than under the prior art.

Figure 4:
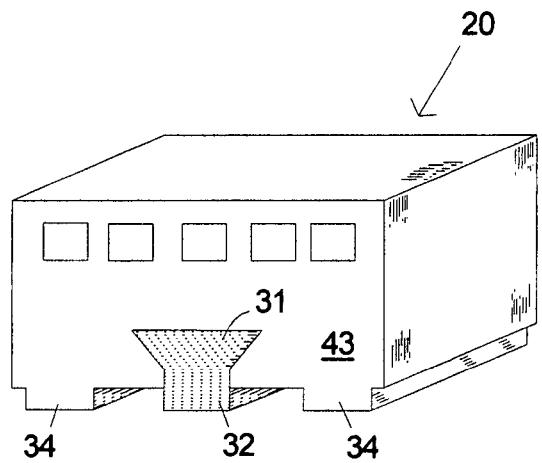
FIG. 4 shows an isometric view of a slider having a sacrificial extension according to the first embodiment of the invention as shown in FIG. 3 after the DRIE process has cut the slider from the wafer.

FIG. 4 shows an isometric view of a slider having a sacrificial extension 32 according to the first embodiment of the invention as shown in FIG. 3 after the DRIE process has cut the slider from the wafer. The view of slider 20 in FIG. 4 is of the trailing edge of the slider surface, i.e., the surface that is the last to pass over the moving magnetic media when in use. The guide rails 34 and the sacrificial extension 32 extend the entire length of the slider, from the trailing edge to the leading edge. The head elements 31 are illustrated as a shaded area that extends into the sacrificial extension 32. The sacrificial extension 32 may also include the anchor base (not shown) which is used in the prior art to support the fragile pole tips during wafer fabrication. The anchor base may, in fact be part of the mask since it is typically made from a material such as NiFe which is not readily etchable in a DRIE process. The internal structure of the head elements 31 are according to the prior art and the details of these structures are independent of the invention. Thus, the invention can be used with any head structure which includes lapping as part of the fabrication process. The head elements 31 include an upper layer of material that is not subject to reactive ion etching (non-RIE-able), for example, CoFe or a NiFe alloy, and, therefore, can be used as part of the mask as well. The body of the slider 43 is a material that is removable by DRIE. Silicon is preferred as a material for the body of the slider, but other RIE-able materials can be used. The embodiment shown includes optional symmetric guide rails 34 that are disposed on the outer edges of the slider bottom surface which will be lapped. The guide rails 34 aid in the lapping process by keeping the lapped surface from canting to one side. The sliders must be held during lapping with the sacrificial extension 32 confronting the lapping plate and may be moved in relation to the lapping plate or the lapping plate may be moved. The guide rails 34 would ideally both be the same height and width, but need not be the same height or width as the sacrificial extension 32. At some point during the lapping process the surfaces of guide rails 34 and sacrificial extension 32 will become coplanar as protruding material is worn away. The guide rails 34 are distinct from the aerodynamic rails which are used to control the flying characteristics of the slider. The guide rails 34 may be completely removed during lapping as will be noted in more detail hereinafter.

Figure 5:
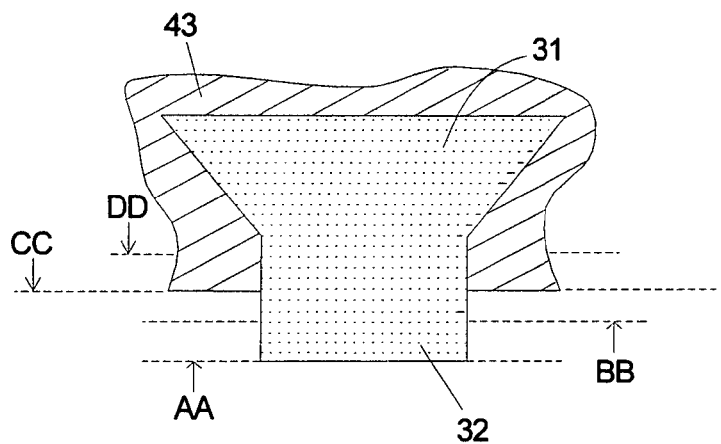
FIG. 5 is an enlarged view of the sacrificial extension shown in the slider of FIG. 4.

FIG. 5 is a magnified view of the sacrificial extension 32 from FIG. 4. This figure illustrates the optional planes at which the lapping process may be terminated. The M-plane is the bottom of the sacrificial extension 32 prior to lapping. In other embodiments the bottom of the sacrificial extension 32 may be shorter than the guide rails 34. The BB-plane is one plane at which the lapping may be terminated leaving a portion of the sacrificial extension 32 and the guide rails (not shown) extending below the surrounding slider surface which is shown as plane CC. The lapping may also be continued until the DD-plane is reached at which point the sacrificial extension and the guide rails will have been completely removed, as well as, some material from the slider surface. The plane at which lapping is terminated is typically referred to as the ABS although additional material for overcoats, aerodynamic structures, etc. may be added after lapping which will result in the true, final ABS being slightly lower than the actual lapping plane.

Figure 6:
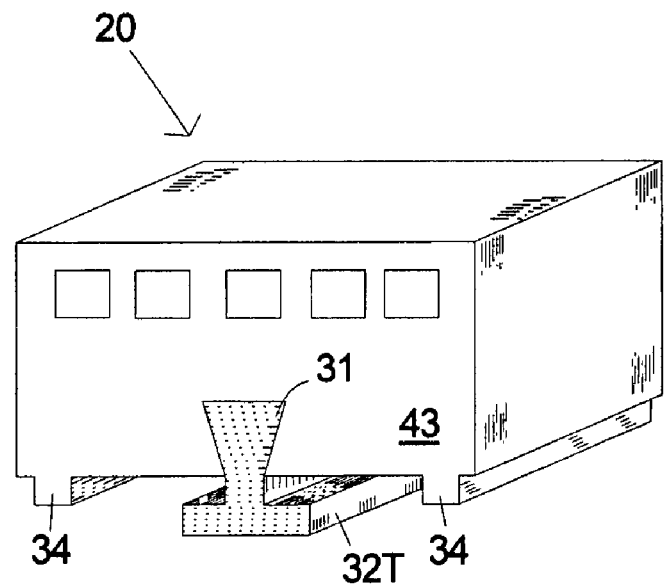
FIG. 6 is an isometric view illustrating the trailing edge of a slider prior to lapping according to a second embodiment of the invention
Figure 7:
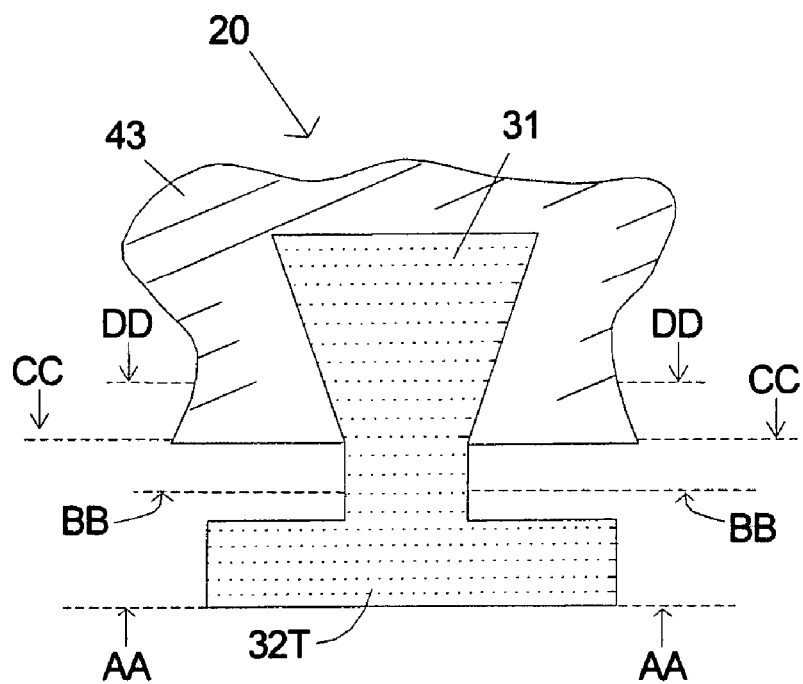
FIG. 7 is an enlarged view of the sacrificial extension shown in FIG. 6.

FIG. 6 shows an isometric view of a slider having a sacrificial extension 32T according to the second embodiment of the invention. In this embodiment the sacrificial extension 32T is structurally weak in the transverse direction because it is formed with a narrow neck (like an inverted "T") which facilitates breaking to allow a significant amount of material to be removed as lapping begins and therefore tends to further reduce the lapping time. The planes shown in FIG. 7 for optional points to stop lapping and thus define the ABS are the same as illustrated in FIG. 6 and FIG. 4.

Figure 8:
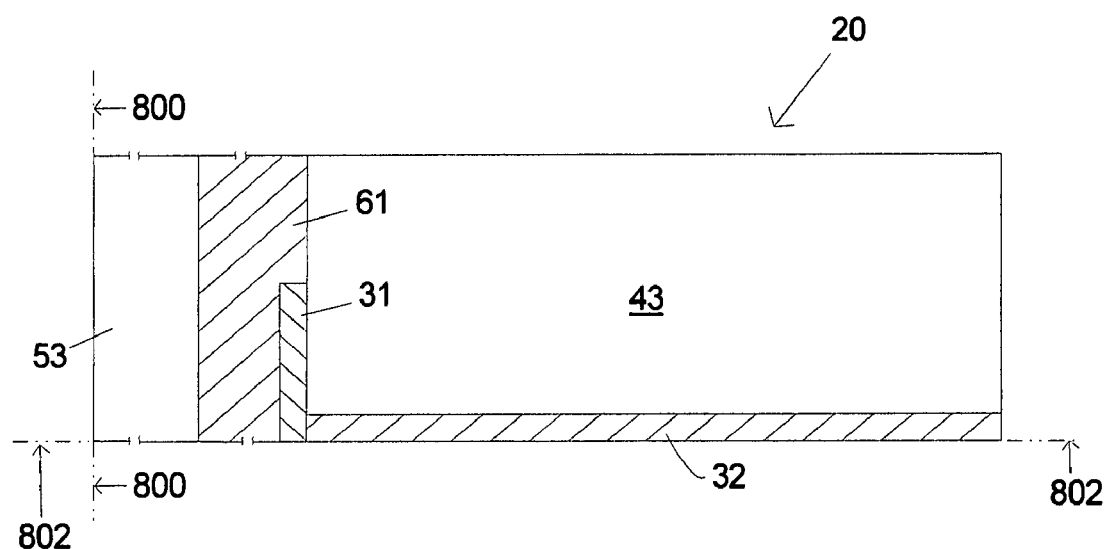
FIG. 8 is a midline sectional view of a slider and mask according to the invention taken perpendicular to the trailing end of the slider (at the left) and the surface to be lapped (at the bottom).

FIG. 8 is a midline cross-sectional view of a slider and mask according to the invention taken perpendicular to the trailing end 800 of the slider 20 and the surface to be lapped, plane 802. In this view, the details of the rails are not shown. FIG. 8 shows that the sacrificial extension 32 extends the entire length of slider 20. The mask 53 covers the entire surface of the slider which is overcoat 61 which has been deposited over the head elements according to the prior art. Plane 802 is indicated for reference as the bottom of the sacrificial extension 32 or an as-lapped ABS surface. The guide rails (not shown) also extend the full length of the slider parallel to the sacrificial extension 32.

Figure 9:
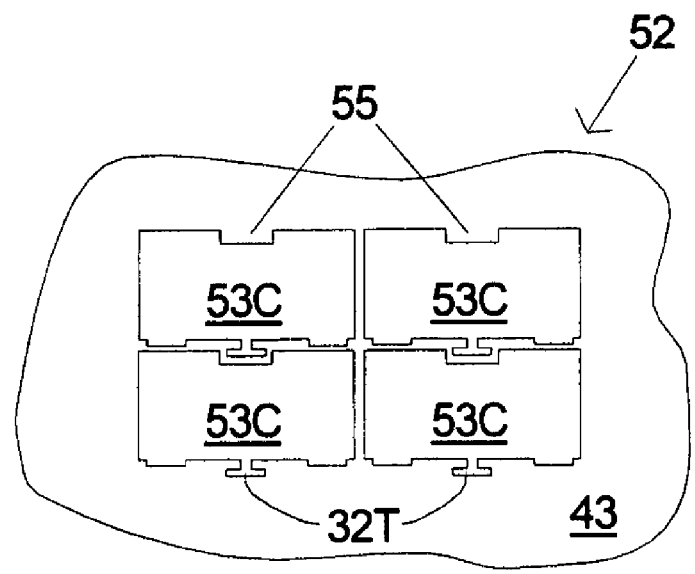
FIG. 9 is a partial view of a wafer with a plurality of masks for sliders according to a third embodiment according to the invention having a channel on the top surface to allow more efficient use of the wafer.
Figure 10:
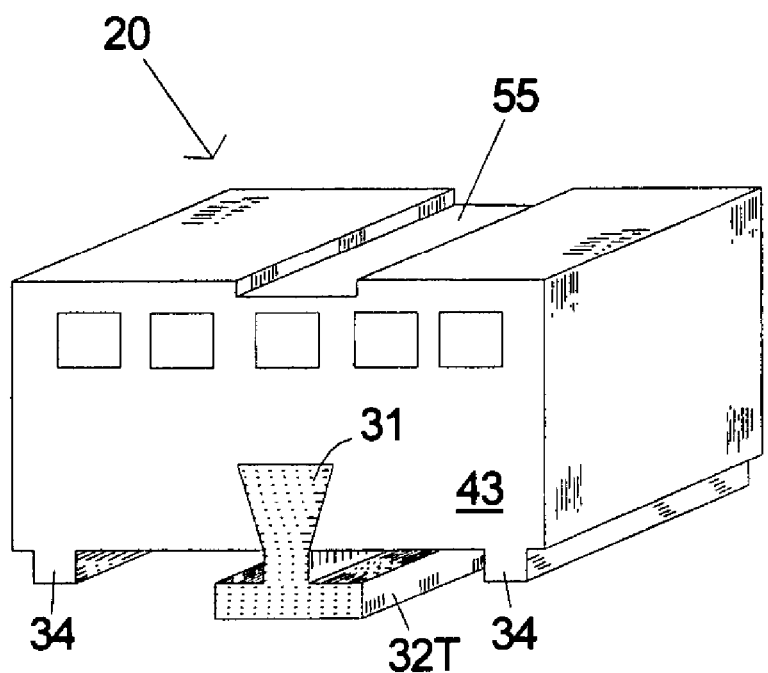
FIG. 10 is an isometric view of a slider shown in FIG. 9 having a channel on the top surface to allow more efficient use of the wafer.

FIG. 9 is a partial view of a wafer 52 with a plurality of masks 53C for sliders according to a third embodiment of the invention having a channel 55 in the top surface (the surface parallel to the ABS). FIG. 10 is an isometric view of a slider 20 according to the third embodiment of the invention. A channel 55 is sized to allow the sacrificial extension 32T or 32 (not shown) to extend into what would otherwise be an adjacent slider. This allows the sliders to be position more densely and, therefore, more efficiently on the wafer. For this efficiency to be achieved the guide rails 34 must not extend as far as the sacrificial extension 32T or 32. However, multiple channels 55 may exist in adjacent sliders to accommodate other sacrificial extensions such as guide rails 34.

Figure 11:
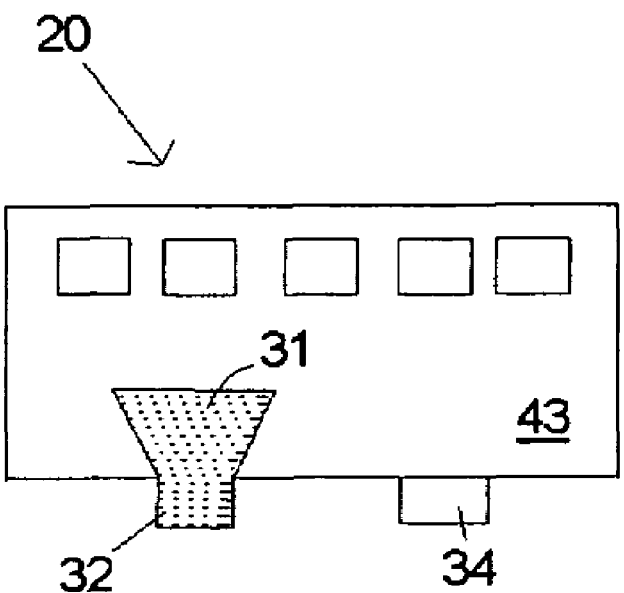
FIG. 11 illustrates the trailing edge of a slider prior to lapping according to an embodiment of the invention having the sacrificial extension and magnetic transducer elements offset from the midline of the slider.
Figure 12:
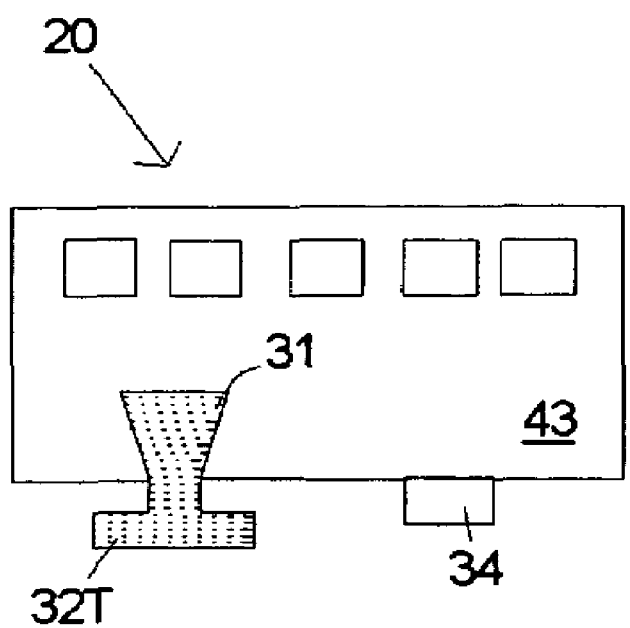
FIG. 12 illustrates the trailing edge of a slider prior to lapping according to an embodiment of the invention having the magnetic transducer elements and sacrificial extension formed with a narrow neck offset from the midline of the slider.

The sacrificial extensions are not necessarily placed along the central plane of the slider. The option exists for placing the magnetic transducer elements off-axis with the sacrificial extension below the sensor. FIG. 11 illustrates the trailing edge of a slider prior to lapping according to an embodiment of the invention having the sacrificial extension and magnetic transducer elements offset from the midline of the slider. Other sacrificial extensions such as guide rails 34 may be formed at other locations on the ABS side of the slider to improve lapping uniformity and/or flatness. As shown in FIG. 11, for example, the sacrificial extension 32 and guide rails 34 are symmetric about the central plane of the slider. Ideally, this will prevent the skew of the slider. In alternative embodiment illustrated in FIG. 12 the offset sacrificial extension 32T may be formed with a narrow neck which facilitates breaking as described above. As an example, an inverted "T" structure can be placed off the central axis of the slider with or without other sacrificial extensions to improve the rate of the lapping of the slider.

One issue for any lapping process is determining when enough material has been removed to achieve the correct stripe height of the sensor and also the throat height of the inductive write head. Electronic lapping guides (ELG's) have been used in the prior art for this purpose. An ELG can be used with the sacrificial extension structure by including it in the guide rails, the sacrificial extension itself or any other portion of the slider which will remain after lapping. In an alternative embodiment of the invention, the sensor structure could be used to determine the stripe height of the sensor and the throat height. Using the sensor has the advantage of allowing a simpler head structure, but adds the complexity of having to electrically connect the sensor structure during lapping without causing any electrical or mechanical damage to the sensor. Using the sensor as a lapping end-point detector is not exclusive to sliders with sacrificial extensions described herein, but can be used an alternative head design and lapping method to achieve a reproducible ABS plane for the slider.

Except where express materials, thickness values, etc., have been given above, the layers, structures and materials in a slider embodying the invention are according to the prior art and are fabricated according to the prior art.

The compositions given herein have been described without regard to small amounts of impurities that are inevitably present in practical embodiments as is well known to those skilled in the art.

Although the embodiments of the invention have been described in a particular embodiment, the invention as described herein is not limited to this application and various changes and modifications will be apparent to those skilled in the art which will be within the scope of the invention.

What is claimed is:

1. A data storage device including:
   magnetic media; and
   a slider including:
   a magnetic transducer for reading and writing information on the magnetic media, the magnetic transducer being positioned at a trailing edge of the slider; on an air-bearing surface; and
   a slider body of a first material, the slider body including:
   a sacrificial extension that is an integral part of the slider body and is composed of the first material, the sacrificial extension covering the magnetic transducer and being aligned with the magnetic transducer, protruding above an adjacent recessed area on the air-bearing surface, having a longest dimension extending from the magnetic transducer along the air-bearing surface to a leading edge of the slider body and being disposed on a midplane oriented through a midline of the air-bearing surface and a midline of an upper surface parallel to and opposite from the air-bearing surface; and
   a channel in the slider body, the channel being aligned with the sacrificial extension on the midplane and being disposed on the upper surface of the slider body, the channel having a longest dimension that is at least as large as the longest dimension of the sacrificial extension and the channel having a width perpendicular to the midplane that is larger than a width of the sacrificial extension perpendicular to the midplane.

2. The data storage device of claim 1 wherein the first material is silicon.

3. The data storage device of claim 1 wherein the sacrificial extension has a planar first surface on the air-bearing surface of the slider extending from the magnetic transducer along the air-bearing surface to a leading edge of the slider, and the sacrificial extension's first surface being coplanar with a first surface of the magnetic transducer on the air-bearing surface.

4. The data storage device of claim 3 wherein the slider body includes a first guide rail composed of the first material and disposed on the air-bearing surface, the first guide rail having a first surface extending from the trailing edge of the slider body along the air-bearing surface to a leading edge of the slider body.

5. The data storage device of claim 4 further comprising a second guide rail on the air-bearing surface parallel to the first guide rail and wherein the first and second guide rails are positioned on opposite sides of the sacrificial extension.

6. The data storage device of claim 3 wherein the first surface of the sacrificial extension is lapped and adjacent recessed areas on the air-bearing surface on two opposing sides are unlapped.

7. The data storage device of claim 1 wherein the magnetic transducer is encapsulated in overcoat material over a trailing surface of the slider.

* * * * *